United States Patent [19]

Ozelis et al.

[11] Patent Number: 4,860,027

[45] Date of Patent: Aug. 22, 1989

[54] INK DROP CONTROL SYSTEM WITH TEMPERATURE COMPENSATION

[75] Inventors: Joseph P. Ozelis, Chicago; Robert I. Keur, Niles, both of Ill.

[73] Assignee: A. B. Dick Company, Chicago, Ill.

[21] Appl. No.: 169,627

[22] Filed: Mar. 18, 1988

[51] Int. Cl.⁴ .............................................. G01D 15/18
[52] U.S. Cl. ......................................... 346/1.1; 346/75
[58] Field of Search .................................. 346/1.1, 75

[56] References Cited

U.S. PATENT DOCUMENTS 4,337,468 6/1982 Mizuno ................................ 346/1.1
4,527,170 7/1985 Iwasaki et al. ......................... 346/75
4,555,712 11/1985 Arway et al. ......................... 346/75
4,714,931 12/1987 Erskine et al. ........................ 346/75

*Primary Examiner*—E. A. Goldberg
*Assistant Examiner*—Gerald E. Preston
*Attorney, Agent, or Firm*—Rockey and Rifkin

[57] ABSTRACT

A method and apparatus are disclosed which provide feedback control of ink viscosity in a drop marking system. The ink flow between two selected points is monitored and compared against a reference value by an electronic controller such as a microprocessor. In the event that a flow time deviation is sensed, appropriate action is taken to change the flow time. A temperature sensor input to the controller permits temperature compensation to maintain ink composition substantially constant.

10 Claims, 4 Drawing Sheets

INK DROP CONTROL SYSTEM WITH TEMPERATURE COMPENSATION

BACKGROUND OF THE INVENTION

This invention relates to the field of drop marking systems of the type in which a liquid ink is forced under pressure through a nozzle which converts the liquid into droplets which can then be controlled by various means while projected toward a substrate for marking purposes. Examples of such systems include the familiar ink jet marking systems used for high speed label printing, product identification and the like, although there are other drop marking systems known in the art. One particular type of system which advantageously employs the present invention is the continuous stream, synchronous ink jet printer. Such a system typically includes an ink reservoir and a remotely located nozzle connected to the reservoir by a conduit. Ink is forced under pressure from the reservoir to the nozzle which emits a continuous stream of ink drops. The ink, which is electrically conductive, is provided with a charge as the drops leave the nozzle. The drops then pass through a deflection field which causes selected drops to be deflected so that some of the drops are deposited onto a substrate while the remaining drops are returned to the reservoir by a suitable ink return means.

It is known in the prior art to sense the flow of the ink from the reservoir and adjust ink parameters to maintain a desired flow rate. This teaching is found in the present assignee's prior U.S. Pat. No. 4,555,712. That patent, of which the present invention is an improvement, is hereby incorporated by reference. In the '712 patent a method and apparatus are disclosed which provide a means for determining and maintaining ink drop velocity substantially constant and does so in a manner which is substantially more accurate than was obtainable in the prior art.

In a preferred embodiment of the '712 patent the control system adjusts the flow rate by controlling the addition of make-up solvent to the ink reservoir. The viscosity of the ink is thereby adjusted so as to maintain drop velocity substantially constant.

Experience with this system has demonstrated that the percentage of solids (dyes and resins) in the ink composition varies, due to solvent addition, by as much as ten to forty percent from its initial composition in the course of the system operating to maintain substantially constant drop velocity as the temperature of the ink varies. Such a wide shift in composition affects other characteristics important in an ink jet system, such as ink drying time, drop break off point and even the charging characteristics of the ink drops. As a consequence, viscosity variations, due principally to temperature fluctuations during operation of the equipment, must be recognized by the control system so that solvent is added in a manner that does not excessively modify the formulation of the inks used in the system.

More specifically, present ink jet fluid control systems employ flow meters, of the type disclosed in the '712 patent, to control the addition of solvent to the ink. However, viscosity and, therefore, flow time, vary as a function of both compositional changes in the ink and temperature. The prior art system did not teach any correction for temperature variation. As a result, solvent may be added to the system when the flow time is too high, principally due to a temperature decrease rather than solvent loss. This can cause the aforementioned wide variation in the ink's composition resulting in undesirable operating characteristics. Conversely, solvent may be withheld from the system when the flow time is kept low by a temperature increase even though solvent may be needed as a result of evaporative losses due to system operation.

Accordingly, it is desired to provide a system which can compensate for both types of viscosity variations (compositional changes and temperature changes).

The present invention measures a change in temperature of the ink at selected intervals and calculates the flow time difference for this temperature change. The result is used to alter the reference flow time used to control the addition of solvent to the system. This results in elimination of the ambiguity due to temperature changes during system operation.

It is known in the art to employ a flow meter and a temperature sensor to determine a representative viscosity of a fluid, such as ink. Exemplary of this type of system is U.S. Pat. No. 4,714,931 to Erskine. As disclosed in connection with FIGS. 1 and 2 of that patent, the addition of solvent is controlled by a microprocessor which receives as inputs flow data from a viscometer 12, pressure from a transducer and temperature data. The Erskine patent, however, employs temperature and pressure values stored in a look up table resident in a read only memory (ROM) to provide reference flow times.

Depending upon the actual temperature and pressure detected, a specific flow time reference value is accessed from the ROM and used by the microprocessor system to control addition of solvent. Such a system cannot take into account the many variations in initial ink viscosity, calibration settings, capillary dimensions, and other system parameters which affect flow time and which differ from installation to installation for the same system or different printer systems of a similar type. Furthermore, the Erskine system depends upon absolute temperature and pressure values and, therefore, inaccuracies, due to the miscalibration of the temperature or pressure sensor, can interfere with the intended operation of the system.

It is accordingly an object of the present invention to provide an improved control system related to the method and apparatus disclosed in U.S. Pat. No. 4,555,712 whereby the effects of temperature variation during system operation can be accounted for.

It is a further object of the present invention to provide a feedback control for a fluid delivery system in which both flow time and temperature are monitored whereby the desired properties of the fluid can be maintained substantially constant by selective adjustment of the flow time.

A further object of the invention is to provide a system of the type described in which temperature differences are employed rather than absolute temperature values, whereby inaccuracies due to miscalibration of the temperature sensor are eliminated.

It is a further object of the invention to provide a dynamic control system which can take into account flow time differences between identical systems due, for example, to manufacturing tolerances or to initial set-up variations. Such a dynamic system periodically recalculates a reference flow time based on a particular system's operating characteristics. System to system variations are, therefore, irrelevant because only flow time and temperature differences relative to initial or preceding values are considered.

These and other objects and advantages of the invention will be apparent from the remaining portion of the specification.

SUMMARY OF THE INVENTION

The present invention periodically calculates a new reference flow time after measuring the ink temperature or a temperature representative thereof. This new temperature reading is converted to a temperature difference between the present temperature and the most recent temperature measurement or the temperature measured initially during system set-up. The temperature difference is used to calculate a new reference flow time. Actual flow times are then compared to this new, reference flow time and, if necessary, solvent is added accordingly.

DETAILED DESCRIPTION

Figure 1:
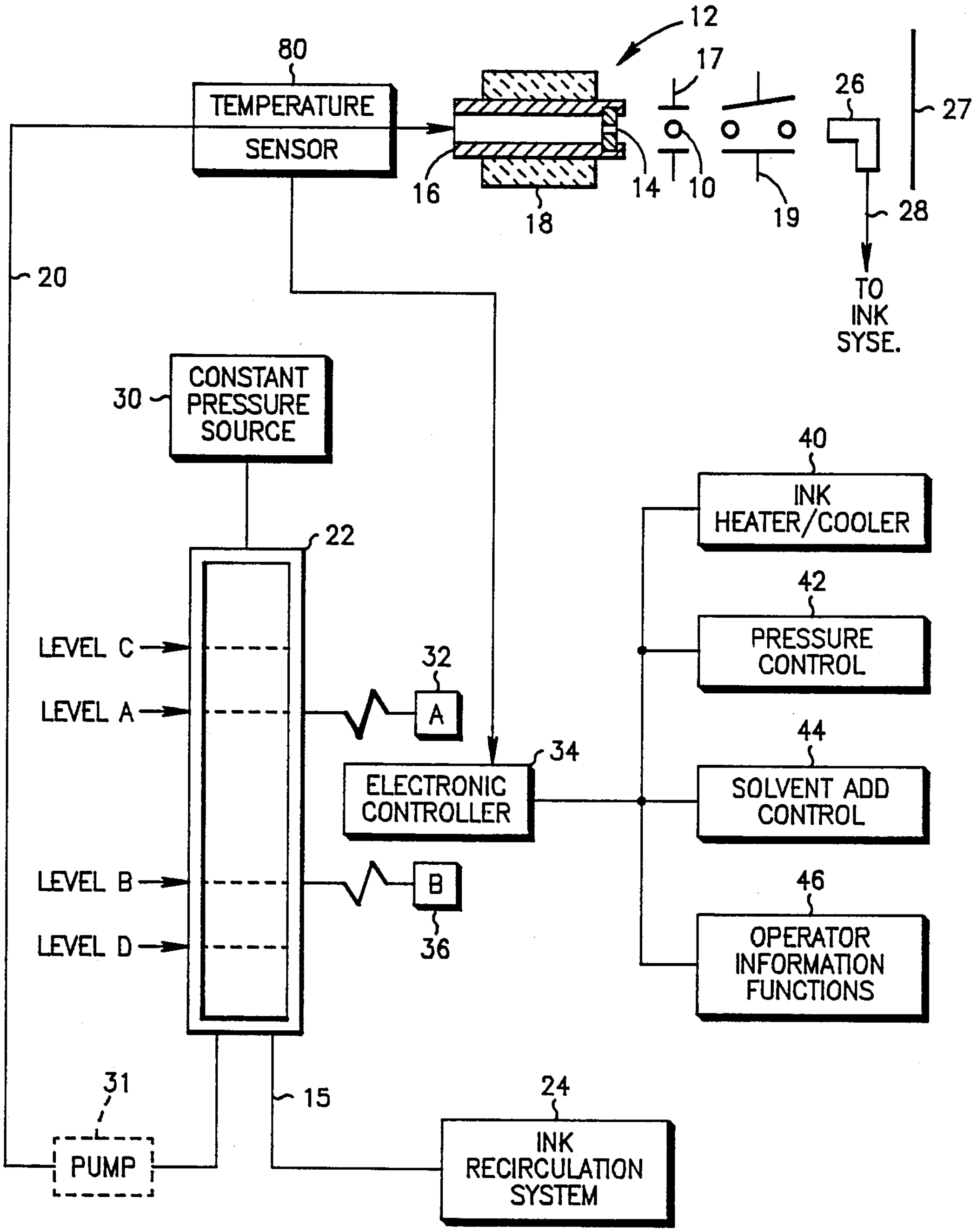
FIG. 1 is a schematic drawing of an ink jet system similar to the system detailed in U.S. Pat. No. 4,555,712 but modified to incorporate the additional elements of the present invention.

Referring to FIG. 1, an ink drop velocity control system of the type described in detail in U.S. Pat. No. 4,555,712 is illustrated. Reference to that patent is made for the details of the system beyond those described herein. In summary, an ink jet nozzle 12 has an orifice 14. The nozzle is acted upon by a piezo electric device 18 causing drops to be formed. The drops pass a charging electrode 17 and an electrical deflection field schematically represented by plates 19. Depending on their charge the drops are directed onto a substrate 27 for marking or are returned to the system via a collector 26.

Ink flows to the nozzle 12 by way of a flexible conduit 20 from a pressurized supply tank 22 which is remotely located from the print head in most applications. The supply tank 22, according to the invention described in the '712 patent, is repetitively filled by suitable means which comprise a part of the recirculation system designated generally at 24 of which the collector 26 is a part. The details of the recirculation system are described in the aforementioned patent in connection with FIG. 2 thereof. In order to cause the ink to flow from the tank 22 to the nozzle 12, a pressure source, for example a gas pressure source 30, is provided as detailed in the '712 patent. Alternatively, in place of the constant pressure source 30 an in-line fluid pump 31 having a pressure regulator and bypass line (not shown) connected to the output thereof in a manner understood by those skilled in the art may be employed to provide ink from the tank 22 to the nozzle 12.

In operation the supply tank or reservoir chamber 22 is filled with an electrically conductive ink to some arbitrarily determined level as indicated at C for example. As ink flows out of the tank to the nozzle the level of ink in the tank decreases until it reaches a second, arbitrarily determined level as indicated at A. When the liquid level reaches A, a first level detector 32 is activated signalling an electronic controller 34 which initiates a timing interval. Ink continues to flow out of the nozzle causing a drop in the tank level until, at some later time, the level of the ink in the supply tank reaches a third, arbitrarily determined level as indicated at B. A second liquid level detector 36 is activated signalling the controller 34 to cease measurement.

When the controller receives this second signal, it compares the time interval or the average of a succession of such intervals to an established reference interval. If necessary the controller then initiates suitable action, as will be described, to cause the ink flow rate through the nozzle to change such that successive time intervals will approach the reference interval.

The level of ink in the tank 22 after passing point B may continue to fall until some suitable level as indicated at D is reached. At this point the ink recirculation system 24 refills the supply tank. Of course, the foregoing is a generalized indication of the location of the various points A through D. Other locations can be selected as desired and, for example, point D will usually be the same as point B so that upon completing measurement of the time interval between points A and B, the recirculation system will refill the tank to level C in preparation for the next time interval measurement.

As indicated, the liquid level detectors 32 and 36 provide their input to an electronic controller 34. The detectors may be of any commercially available type as, for example, a magnetic float which actuates a reed switch whereby a change in state of the reed switch (open to close or vice versa) is detected by the controller 34.

The controller may be a solid state logic system or a programmed computer as, for example, a microprocessor computer system such as the Intel 8031 microcontroller. Responsive to the switches 32 and 34, the controller will activate one or more output devices under its control as indicated schematically in FIG. 1. These devices include ink heating and/or cooling means 40, pressure control means 42 or solvent control means 44. In addition, the controller may operate an information display, such as a LED or LCD display, to provide information to an operator concerning the status of the system as indicated at 46.

The specific means 40 through 44 are discussed in detail in connection with the embodiments of FIGS. 2 through 6 of the '712 patent. However, it can be seen that the invention is directly responsive to the flow rate data derived form the flow of ink between points A and B. The electronic controller operates the system to selectively adjust the flow rate of the ink through nozzle orifice 14, preferably by adjusting the solvent component of the ink composition, in a manner that assures consistency of the ink composition during operation of the system.

The specific operation of the electronic controller is discussed in connection with FIGS. 7A and 7B. of the '712 patent and FIG. 3 of the present disclosure. A summary of its operation, however, is presented here. The controller is provided a reference time for the flow of an established quantity of ink, that is, the quantity of ink between the points A and B. To initialize the system, either automatically or under operator control, the velocity of the drops is set thereby establishing a a reference flow time. For example, pressure is adjusted until the desired drop velocity is obtained. As the system operates, the controller stores and averages a number of measurements of time required for the ink to pass between levels A and B. When the required number of measurements have been taken the reference time is compared against the average time of the actual measurements. If the actual measurements are greater than the reference, it is necessary to increase flow through the nozzle orifice. Preferably, this is effected by adding solvent to lower ink viscosity.

On the other hand, if the computed total is less than the reference value, it is necessary to modify the ink composition to decrease the flow through the nozzle orifice and opposite actions are required. For example, simply not adding solvent to the ink will increase its viscosity due to the normal evaporative losses as the ink circulates through the marking system.

The controller repeats the above actions to maintain a substantially constant measured time interval. The rate at which the measurement cycles occur is a function of the size of the supply tank, typically on the order of 10 ml, the precision required and a number of related factors including whether or not the system is utilized for one ink jet nozzle or multiple nozzles. For example, with a single ink jet head it may be sufficient to check flow rate at approximately one minute intervals but shorter or longer intervals may also be employed.

In order to improve upon the system of the '712 patent, a temperature sensor is provided in the present invention. The temperature sensor 80 is preferably located just behind the nozzle 12 as close to the drop stream as physically possible. In this way the temperature that is measured is essentially the temperature of the ink flowing through the nozzle orifice. While this is the preferred manner in which temperature sensing is accomplished, it should also be recognized that the temperature sensor may instead be located away from the nozzle at a location where it will still provide a temperature reading representative of the ink temperature.

The output of the temperature sensor 80 is provided to the electronic controller 34 along with the flow data from the liquid level detectors 32 and 36. The electronic controller then determines whether the reference flow time requires change (as explained subsequently) and if a change is warranted then it employs one or more of the control means to correct any detected variation in flow rate.

Figure 2:
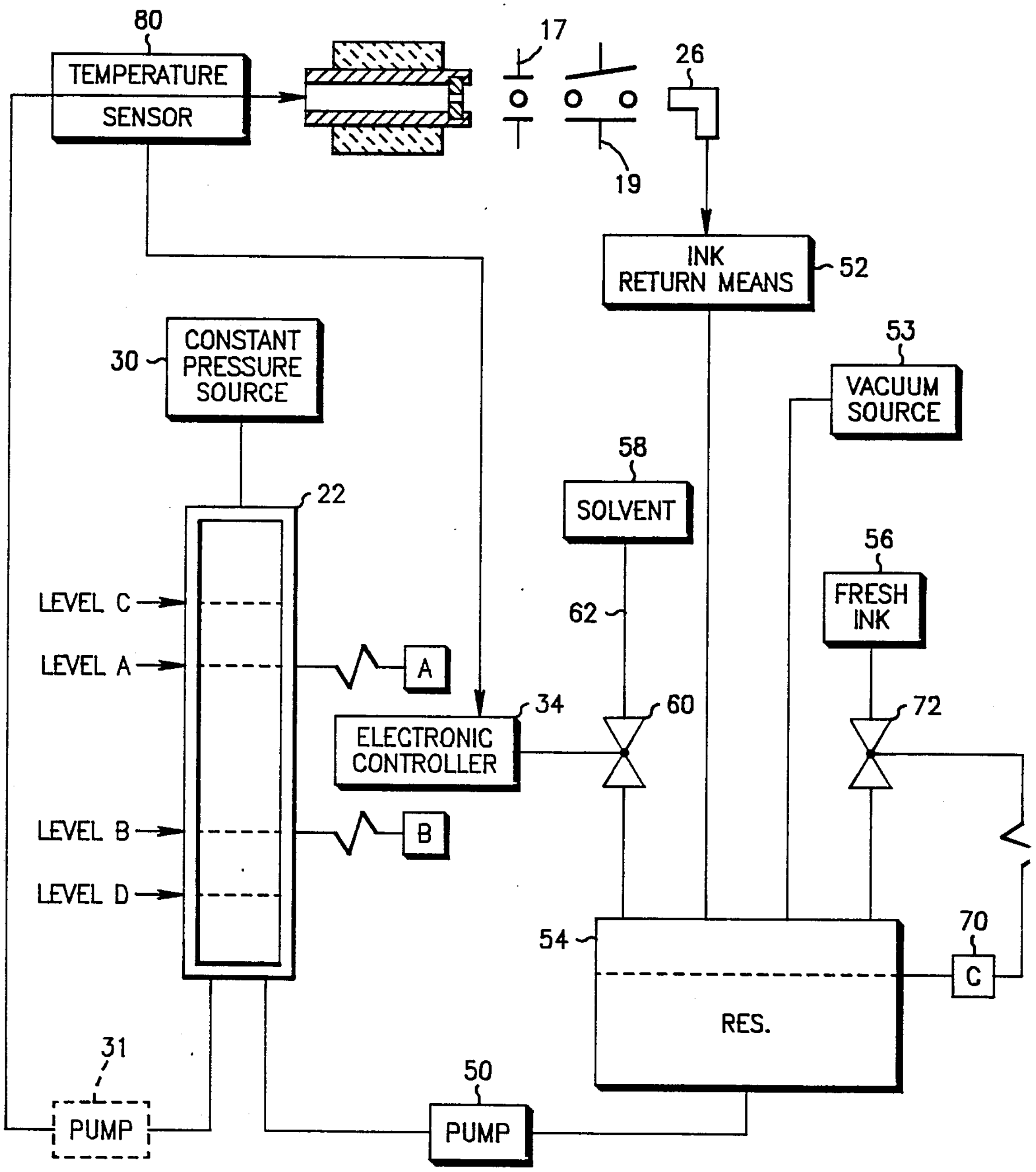
FIG. 2 is a drawing similar to FIG. 2 of U.S. Pat. No. 4,555,712 but modified to illustrate a preferred embodiment of the present invention.

Referring to FIG. 2, the preferred embodiment of the present invention is illustrated. This preferred embodiment utilizes a solvent control system in conjunction with the electronic controller 34. This embodiment is described in detail in the '712 patent except for the temperature compensation aspects of the present invention. Initially, the operator enters a two digit number, gamma, related to the characteristics of the ink and the system and sets the ink stream velocity to a desired value. Gamma, as described hereafter, is calculated based on the viscosity properties of a given ink composition and certain system parameters.

Figure 3:
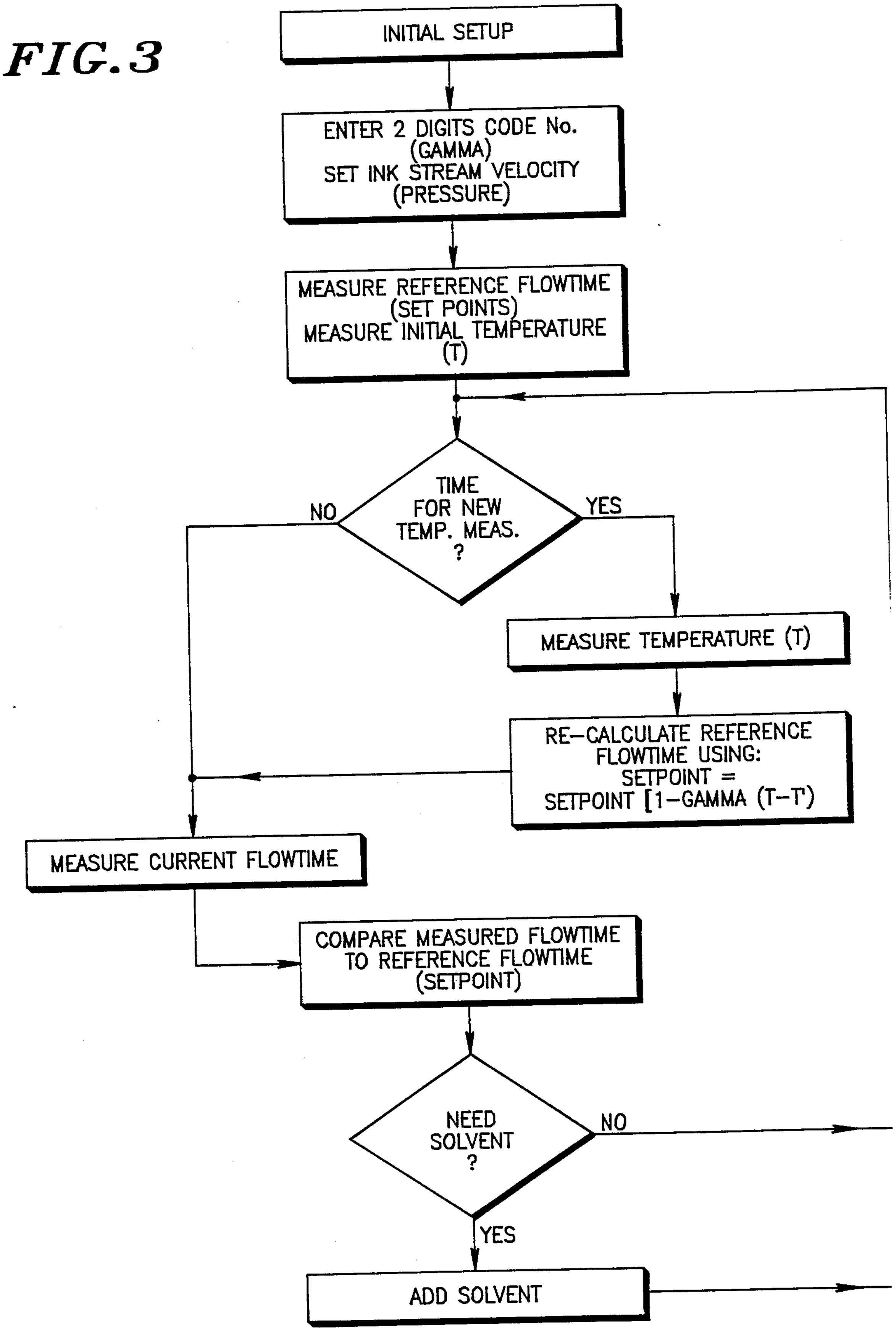
FIG. 3 is a flow diagram suitable for use in programming a microcomputer to perform the present invention.

The operator then calls the initialization routine shown in FIG. 3. During this routine the system determines a reference flow time (Set Point), by the method described in the '712 patent and summarized earlier herein. The system also measures the ink temperature provided from sensor 80, obtaining an initial value T. The system is now operational and will utilize the flow rate information provided at initialization until such time as a recalculation of the set point occurs.

During operation each time the tank 22 empties, the flow time is measured and after the average is taken such average flow time is compared to the Set Point value. Solvent is added accordingly by the solvent supply system if and when necessary as described in detail in the '712 patent. After a selected period of time, for example ten minutes, the system again measures the ink temperature, receiving a new value, T'. The electronic controller computes a temperature change delta T where delta T equals the temperature difference. It then calculates a new reference flow time based on the equation:

Set Point' = Set Point (1-gamma (delta T))

Set Point' becomes the new reference flow time and is thereafter Set Point. Actual flow times are then compared with this updated Set Point. Subsequent values of the reference Set Point can be calculated based upon the detected temperature difference between the current temperature and either the most recent temperature measurement or the temperature measured at the time of initial set-up of the system. In this way changes in operating temperature are compensated for dynamically. This achieves the objective of the present invention, namely, ink composition consistency by selective adjustment of the flow time based on detected temperature differences of the ink. After another fixed period of time the electronic controller repeats this procedure, again taking a new temperature measurement and computing a new Set Point value.

Figure 4:
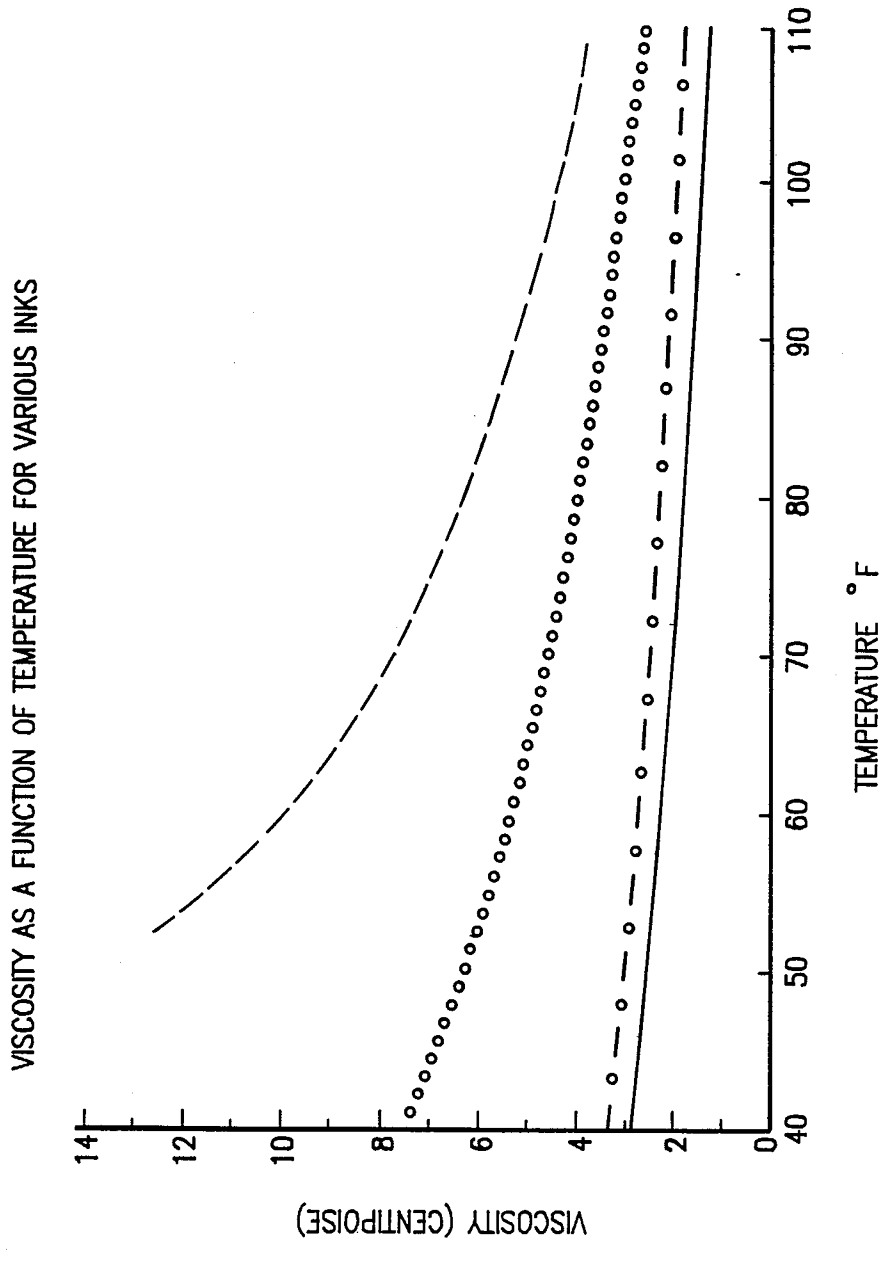
FIG. 4 is a plot of ink viscosity versus temperature for typical ink compositions.

Gamma is related predominantly to the physical properties of the ink and may be thought of as a temperature responsive factor for a given ink. FIG. 4 illustrates the relationship between viscosity and temperature for typical ink compositions suitable for use in the present invention. If the system operator wishes, a value of gamma different than the gamma specified for a given ink can be entered into the system to obtain specialized response characteristics. This is an advantage of the present invention over that disclosed in the Erskine U. S. Pat. No. 4,714,931 which uses temperature compensation values stored in a read only memory.

The factor gamma can be derived through mathematical analysis as follows. Consider a model fluid system having a nozzle with orifice diameter d and some effective length l. For a fluid with density $\rho$, surface tension $\sigma$, and viscosity $\mu$, the total pressure distribution of the system becomes:

$$P_{input}=32\mu\int(v/d^2)dl+4\sigma/d+PV_{str}/2 \quad (1)$$

where $P_{input}$ is the input pressure of the system, v is the fluid velocity at any point in the system, and $v_{str}$ is the velocity of the free jet.

The first term, which gives the pressure loss due to viscosity as a consequence of the law of Hagen-Poiseuille, must be integrated along the entire fluid system. In general, this is difficult to do. However, if we define an effective length of the system such that the pressure loss through the effective system is identical to the pressure loss of the real system, we then have:

$$\Delta P=P_{input}-Pv^2/2-4\sigma/d=32\ \mu vl_{eff}/d^2 \quad (2)$$

This transforms eqn. (1) into the following:

$$P_{input}=\rho v^2/2+4\sigma/d=32\mu vl/d^2 \quad (3)$$

where $v_{stream} = v_{stream} = v$ and $l = l_{eff}$.

Eqn. (3) can now be solved to yield an expression for the stream velocity as a function of the fluid viscosity:

$$v = [-32\mu l/d^2 + \sqrt{(32\mu l/d^2)^2 + 2\rho(P - 4\sigma/d)}\,]^{\frac{1}{\rho}} \qquad (4)$$

Now, to determine the relationship between the change in viscosity and the change in stream velocity, we differentiate eqn. (4):

$$\frac{dv}{d\mu} = \frac{(32l/d^2)}{\rho}[32\mu l/d^2 [(32\mu l/d^2)^2 - 2\rho(P - 4\sigma/d)]^{-\frac{1}{2}} - 1] \qquad (5)$$

Eqn. (5) gives the rate of change of stream velocity with respect to changes in fluid viscosity.

In an inkjet system using a flowtimer, the relationship between stream velocity and flow time for a fixed volume of ink to flow through the orifice is:

$$t = 4V/cv\pi d^2) \qquad (6)$$

where V is the volume of fluid used to determine the flow time, v is the stream velocity, and d the orifice diameter.

Eqns. (5) and (6) can be used to determine the relationship between flow time changes and fluid viscosity changes, namely:

$$\frac{dt}{d\mu} = \frac{-128Vl}{\pi\rho d^4 V^2}\left\{\frac{32\mu l}{d^2}\left[\left(\frac{32\mu l}{d^2}\right) + 2\rho(P - 4\sigma/d)\right]^{-\frac{1}{2}} - 1\right\} \qquad (7)$$

Eqn. (7) gives the change in flow time as a function of the change in fluid visocity for a system with the specified parameters. To calculate the percent change in the flow time, we simply divide the result of eqn. (7) by the flow time $t_f$:

$$\frac{1}{t}\left(\frac{dt}{d\mu}\right) = \frac{-128Vl}{\pi\rho d^4 V^2}\cdot\frac{1}{t}\left(\frac{32\mu l}{d^2}\left[\left(\frac{32\mu l}{d^2}\right)^2 + 2\rho(P - 4\sigma/d)\right]^{-\frac{1}{2}} - 1\right) \qquad (8)$$

Using eqn. (6) to eliminate flow time t and volume V from eqn. (8), it follows that $$\frac{1}{t}\left(\frac{dk}{d\mu}\right) = \frac{-32l}{\rho d^2 v}\left[\frac{32\mu l}{d^2}\left[\left(\frac{32\mu l}{d^2}\right) + 2\rho(P - 4\sigma/d)\right]^{-\frac{1}{2}} - 1\right] \qquad (9)$$

Now, to employ eqn. (9) in an inkjet control system that can compensate for temperature fluctuations in viscosity, the behavior of the ink viscosity with temperature must be known. This knowledge can be obtained by measuring the ink viscosity over a temperature range for each ink, thereby generating a family of curves as shown in FIG. 4. The behavior of the ink with respect to temperature can then be obtained by taking the slope of the viscosity vs. temperature curve at the temperature region of interest. This slope, m, is used in conjunction with eqn. (9) to adjust the flowtime of the ink system as a result of changes in temperature.

For convenience, we can define a system parameter gamma such that:

$$\text{gamma} = m\left[\frac{1}{t}\left(\frac{dt}{d\mu}\right)\right] \qquad (10)$$

The flow time is represented in eqn. (10) by t. The factor gamma gives the fractional change in flow time as a function of change in temperature through the following fundamental relation:

$$SP' = SP(1\text{-gamma } \Delta T) \qquad (11)$$

where SP' is the new flow time, SP the previous or initial "set point" flow time, and $\Delta T$ the change in temperature between the time when SP was last determined or initially determined and the present time.

Note that each ink considered will have its own unique value of gamma, since gamma depends on both the specific ink viscosity behavior with temperature and the value of $(1/t)(dt/d\mu)$, which also depend on viscosity.

In practice by evaluating eqn. (9) for various actual systems, it is found that $(1/)(dt/d\mu)$ is a slowly varying function of viscosity and can be considered a constant. It is, therefore, the different behaviors of ink viscosity with temperature that lead to the uniqueness of the value gamma for each ink type.

One can obtain the factor gamma empirically by measuring the stream velocity as a function of temperature for each ink to be used in the inkjet system. Then, by dividing the measured values of stream velocity by the operational value of the product of drop spacing and frequency, the latter being defined by the system specifications, we find the percent change in stream velocity (or flow time) as a function of temperature. Plotting this against temperature, yields a line, the slope of which is gamma. This must be done for each ink that will be used in the system and must be carried out without any evaporative losses to the ink, which would artificially change the ink viscosity.

From the foregoing it will be understood that there is disclosed herein a system which is capable of dynamic feedback control of an ink jet system. The invention periodically recalculates a reference flow time based initially on a particular system's desired flow time at set up. In performing the recalculation the reference flow time is adjusted to compensate for changes in temperature from the preceding calculation of the reference flow time or from the initial value of the flôw time. The result is a dynamic system which can control flow rate according to a defined relation while maintaining the ink composition substantially the same regardless of variations between systems and changes in operational temperatures. The actual temperature of the ink sensor is not critical, only the change in temperature from measurement to measurement is important. In other words, absolute knowledge of the ink temperature is not required. By providing the operator with an initial values of gamma suitable for each different type of ink the system can be programmed to control the flow rate under virtually all normal operating temperature conditions while maintaining ink composition near initial values.

While we have shown and described embodiments of the invention, it will be understood that the description and the illustrations are offered merely by way of example, and that the invention is to be limited in scope only by the appended claims.

We claim:

1. In an ink composition controller for a drop marking system having an ink supply reservoir, a nozzle to form a stream of ink drops, means to force the ink to the nozzle from the reservoir, means for measuring the time interval required for an established volume of ink to flow through the nozzle, controller means responsive to said measuring means for comparing said time interval against a reference value, SP to identify deviations from the latter and means responsive to the controller means for selectively altering the ink flow rate, the improvement comprising:

(a) means for sensing the temperature of the ink;

(b) said controller means including recalculating means responsive to said temperature sensing means for periodically determining a temperature change and recalculating said reference value, SP, to compensate for such temperature change in the ink;

whereby temperature induced changes in flow time and viscosity are accounted for.

2. The apparatus in accordance with claim 1 wherein said temperature sensing means is located adjacent the nozzle to provide a representation of the temperature of the ink therein.

3. The apparatus in accordance with claim 1 wherein said controller means further includes:

means for inputting to said recalculating means an ink specific parameter, gamma, relating viscosity variation of a given ink to ink temperature, said recalculating means computing a new reference value according to the formula:

SP'=SP(1−gamma(delta T))

where

SP is the existing reference value

SP' is the new reference value delta T is the change in temperature since a preceding determination of SP.

4. The apparatus according to claim 3 wherein said ink specific parameter is given by the formula:

$$\text{gamma} = m\left[\frac{1}{t}\left(\frac{dt}{d\mu}\right)\right]$$

where m is the slope of the viscosity vs. temperature curve over the region of interest for a given ink and t is the flow time.

5. An ink composition controller in accordance with claim 1 wherein the altering means includes means for changing the viscosity of the ink.

6. An ink composition controller in accordance with claim 5 wherein the viscosity changing means includes means for adding solvent to said ink, whereby adding solvent lowers ink viscosity increasing the flow rate and vice versa.

7. An ink composition controller in accordance with claim 1 wherein said controller means is a programmed computer.

8. A method for controlling ink flow time and viscosity in a drop marking system having an ink supply a nozzle to form a stream of ink drops and means to force the ink to the nozzle from the supply for which a reference flow time interval, SP, has been determined, said method comprising the steps of:

(a) measuring the time interval required for a known volume of ink to flow to said nozzle, (b) comparing the time interval against said reference value, SP, to identify deviations therefrom, (c) altering the ink flow rate to maintain said time interval substantially equal to said reference value, (d) periodically sensing the temperature change of the ink in the time period since SP was determined, (e) periodically recalculating said reference value, SP, to compensate for the sensed temperature change in the ink, whereby temperature induced changes in flow time and viscosity are accounted for.

9. The method in accordance with claim 8 wherein the temperature sensing of the ink is accomplished adjacent the nozzle.

10. The method in accordance with claim 8 further including the steps of:

inputting an ink specific parameter, gamma, relating viscosity variation of a given ink to ink temperature, periodically recalculating said reference value according to the formula:

SP'=SP(1−gamma(delta T))

where

SP is the existing reference value

SP' is the new reference value delta T is change in temperature since a preceding determination of SP.

* * * * *